US012809923B2

(12) United States Patent
Simon et al.

(10) Patent No.: US 12,809,923 B2
(45) Date of Patent: Nov. 24, 2026

(54) METHODS AND SYSTEMS FOR PEOPLE CENTRIC DATA DISCOVERY

(71) Applicant: Proofpoint, Inc., Sunnyvale, CA (US)

(72) Inventors: Jeremie Arnaud Simon, Singapore (SG); Ho Sze Tah, Singapore (SG); Yohan Winata, Singapore (SG)

(73) Assignee: Proofpoint, Inc., Sunnyvale, CA (US)

( * ) Notice: Subject to any disclaimer, the term of this patent is extended or adjusted under 35 U.S.C. 154(b) by 56 days.

(21) Appl. No.: 18/631,318

(22) Filed: Apr. 10, 2024

(65) Prior Publication Data

US 2024/0346089 A1 Oct. 17, 2024

(30) Foreign Application Priority Data

Apr. 10, 2023 (SG) .......................... 10202300987Y

(51) Int. Cl.
*G06F 16/93* (2019.01)

(52) U.S. Cl.
CPC .................................... *G06F 16/93* (2019.01)

(58) Field of Classification Search
None
See application file for complete search history.

(56) References Cited

U.S. PATENT DOCUMENTS 11,611,590 B1 * 3/2023 Amar .................. G06Q 10/105
2020/0311304 A1 * 10/2020 Parthasarathy ..... G06F 11/3006
2022/0405417 A1 * 12/2022 Weidner ............. G06F 21/6245

OTHER PUBLICATIONS

William M. Hunkapiller; Examining Cybersecurity Attitudes and Behaviors of Very Attacked People Within a Hybrid Workforce; Florida State University College of Education; pp. 1-19 (Year: 2022).*

* cited by examiner

*Primary Examiner* — Albert M Phillips, III
*Assistant Examiner* — Jermaine A Mincey
(74) *Attorney, Agent, or Firm* — Banner & Witcoff, Ltd.

(57) ABSTRACT

Systems and methods for data discovery within documents in one or more data repositories in a computer network or cloud infrastructure for protection of sensitive data are provided. The method includes selecting a data discovery starting point within the documents in the one or more data repositories in the computer network or the cloud infrastructure and identifying a user associated with one or more documents at the data discovery starting point. The method further includes discovering data using activities and/or relationships of the user to discover subsequent documents to identify the sensitive data.

14 Claims, 4 Drawing Sheets

200

METHODS AND SYSTEMS FOR PEOPLE CENTRIC DATA DISCOVERY

PRIORITY CLAIM

This application claims priority from Singapore patent application Ser. No. 10/202,300987Y filed on 10 Apr. 2023.

TECHNICAL FIELD

The present invention relates generally to data privacy and security, and more particularly relates to methods and systems for people centric data discovery.

BACKGROUND OF THE DISCLOSURE

In today's hybrid work environment, businesses face a broad and varied threat landscape as they grapple with deploying and securing remote environments while deterring ever-more opportunistic cybercriminals. We see numerous recent attack methods focused on users in relatively new working conditions across a much larger attack surface. People are unquestionably the new perimeter and, in some instances, the last line of defense against a heightened combination of advanced threats, data loss, and compliance risks. While many Chief Information Security Officers feel at risk of suffering an imminent material cyberattack, organizational cyber preparedness remains a major concern with many still feeling that their organization is unprepared to cope with a targeted cyberattack.

When discovering data to be protected or data for which to prioritize security measures, conventional data discovery methods usually examine data from a top (root) container. However, this method for discovering data is data-centric and does not reflect how the data is created or consumed. In addition, a data-centric approach may take a long time before discovering a majority of data to focusing protection.

When identifying sensitive information or bolstering cyber security, the instinct is often to protect the organization's top executives, the Very Important People (VIPs). However, organizations that continue to focus on protecting VIPs may be missing the forest for the trees. Individuals who are most often targeted by today's cyber criminals need not be top executives. It is increasingly found that threat actors are taking a highly strategic approach to how they target individuals in an organization. They do their research, reviewing organization charts and how the business operates. While all employees can fall victim to external attacks on an organization, some are more attractive targets than others and may not only be the VIPs.

Thus, there is a need for methods and systems for data discovery that may be used for identifying and prioritizing sensitive data that is quick, efficient and accurate which does not rely on examining data from a root container nor navigating through directory structures. Furthermore, other desirable features and characteristics will become apparent from the subsequent detailed description and the appended claims, taken in conjunction with the accompanying drawings and this background of the disclosure.

SUMMARY

According to an embodiment of the present invention, a method for data discovery within documents in one or more data repositories in a computer network or cloud infrastructure for protection of sensitive data is provided. The method includes selecting a data discovery starting point within the documents in the one or more data repositories in the computer network or the cloud infrastructure and identifying a user associated with one or more documents at the data discovery starting point. The method further includes discovering data using activities and/or relationships of the user to discover subsequent documents to identify the sensitive data.

In accordance with another embodiment of the present invention, a data discovery system for protection of sensitive data is provided. The system includes one or more data repositories in a computer network or cloud infrastructure having data stored therein, a processor, and a storage device for storing instructions. The data is managed by an organization and includes sensitive data. The processor is coupleable to the one or more data repositories in the computer network or cloud infrastructure. The processor is configured to operate in response to the stored instructions to couple to the one or more data repositories in the computer network or cloud infrastructure, select a data discovery starting point within the documents in the one or more data repositories in the computer network or the cloud infrastructure, identify a user associated with one or more documents at the data discovery starting point, and discover data using activities and/or relationships of the user to discover subsequent documents to identify the sensitive data.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiments to present novel methods and systems utilizing data discovery logic which is people centric rather than data centric. Changing the discovery logic to move from data centric to people centric is based on the hypothesis that some people tend to work with more sensitive data than others, such as people in the Finance or the Human Resources departments. Similarly, senior members are more likely to be working with more sensitive data. Other people may need to be prioritized for protection, such as leavers or Very Attacked People (VAP). Leavers include employees leaving an organization for not only typical leaving events such as dismissal and resignation but also for deemed events such as death, bankruptcy and divorce. As to VAPs, while all employees can fall victim to external attacks on an organization, VAPs are more attractive and more targeted employees and they are rarely the firm's most senior executives. They tend to be employees with access to sensitive information such as those able to perform wire transfers at an organization.

Figure 1:
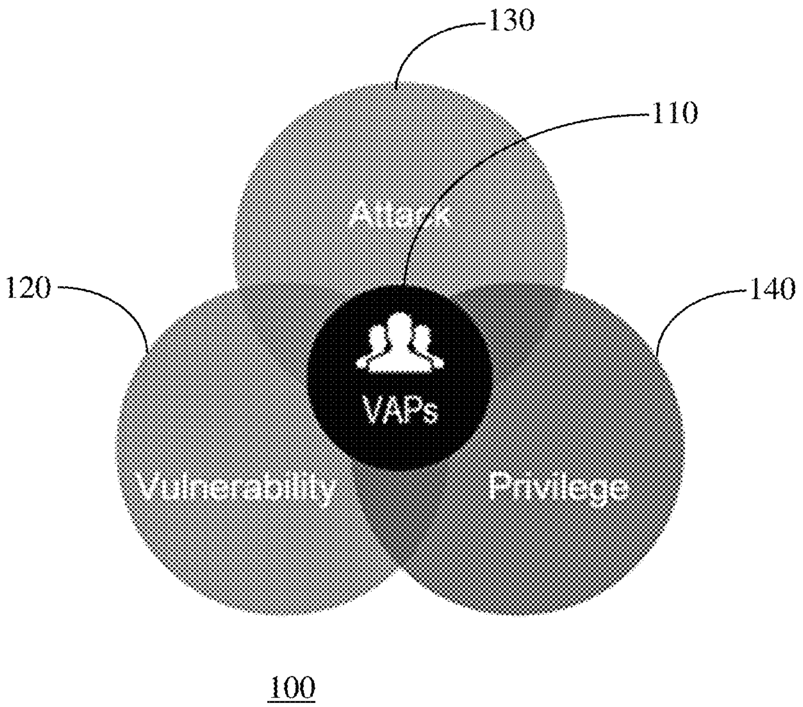
FIG. 1 depicts a Venn diagram of properties defining Very Attacked People (VAP) in accordance with the present embodiments.

Referring to FIG. 1, a Venn diagram 100 illustrates properties used in accordance with the present embodiments to determine whether employees are VAPs 110. One property that may indicate an employee is a VAP is "vulnerability" 120. An employee can be determined to be "vulnerable" if they work in high risk ways such as they click on malicious content, they fail awareness training or they use risky devices or cloud services.

Another property that may indicate an employee is a VAP is "attack" 130, such as those employees who are highly targeted by threats. An employee can be determined to be within an "attack" group if they are highly targeted by attacks or if they receive very sophisticated attacks or a high volume of attacks.

A third property that may indicate an employee is a VAP is "privilege" 140. Employees within the "privilege" group are those employees who have access to valuable data which includes those employees such as those in Finance, Human Resources or Information Technology departments or senior managers who can access or manage critical systems or access sensitive data.

Identifying an organization's VAPs 110 can be done by leveraging mathematical concepts to examine the severity and scale of cyber threats faced, as well as other data points such as what sort of URLs users are clicking on and how well they perform in phishing simulations. Machine learning and multi-layered detection techniques are also critical in identifying and dynamically classifying today's cyber threats, including imposter email, phishing, malware, spam, bulk mail and more. Crunching these numbers provides us with a view of who the VAPs in a firm are and provides a distinct advantage over attackers as efforts can be prioritized to secure users the same way attackers are prioritizing their attacks on VAPs. Training can then be tailored to address specific threats and job roles, address threats with greater certainty, and continually monitor the skill level of the VAPs on the front line of protecting security and privacy.

In regard to methods and systems for data discovery, changing the discovery logic to move from data centric to people centric in accordance with the present embodiments based on the hypothesis that some employees tend to work with more sensitive data than others or may need to be prioritized for protection, such as leavers or VAPs, enables identification and protection of sensitive data. By leveraging some data storage features in accordance with the present embodiments, it is possible to change the data discovery method to navigate through users' relationships and permissions instead of the conventional method of following a directories' structure.

Figure 2:
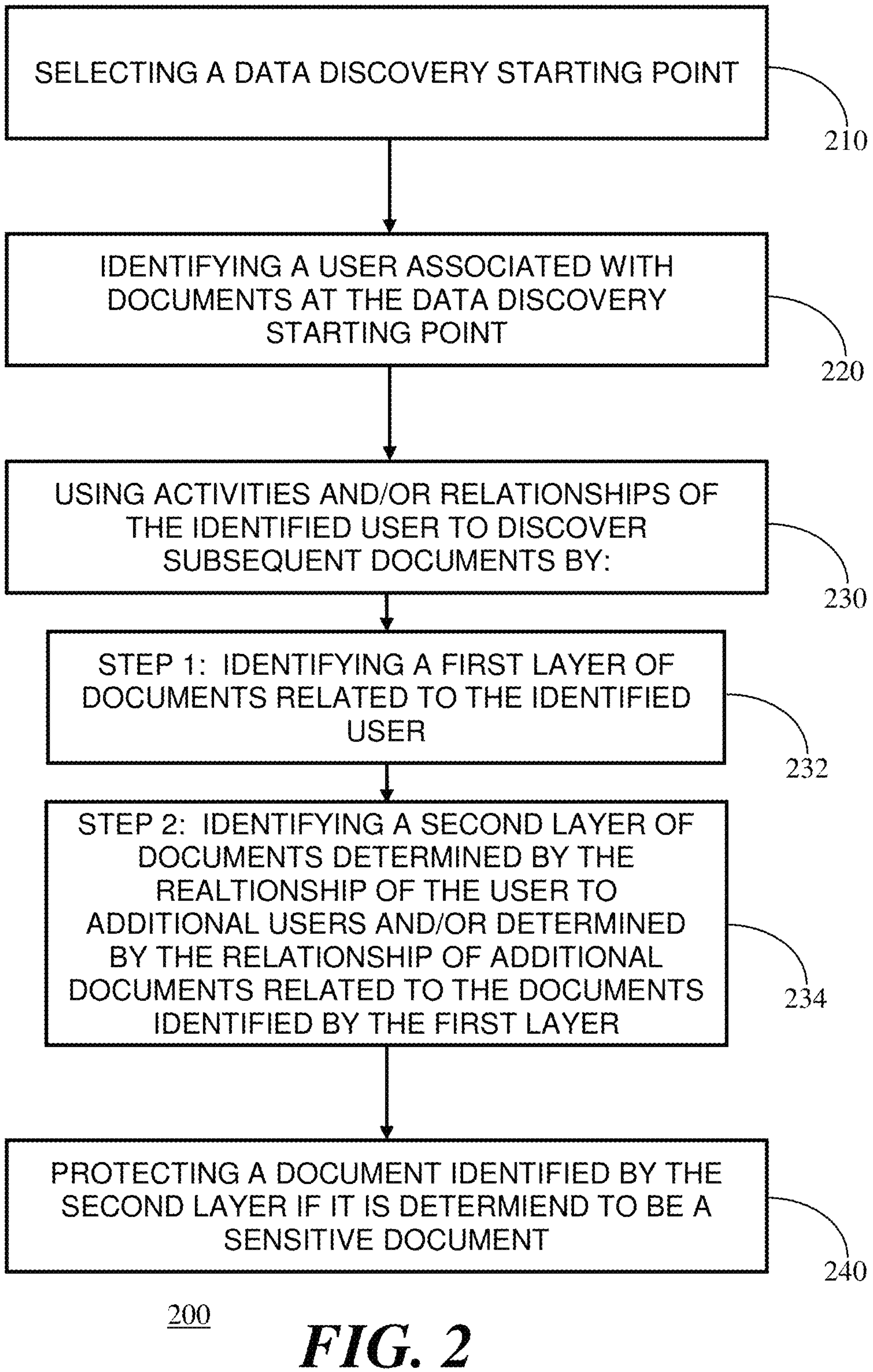
FIG. 2 depicts a flowchart of a process for data discovery in accordance with the present embodiments.

Referring to FIG. 2, a flowchart 200 depicts a process for data discovery in accordance with the present embodiments. The method includes selecting 210 a data discovery starting point within the documents in the one or more data repositories in the computer network or the cloud infrastructure and identifying 220 a user associated with one or more documents at the data discovery starting point.

The selecting 210 the data discovery starting point within the documents in the one or more data repositories in the computer network or the cloud infrastructure may include selecting a data discovery starting point within a set of documents managed by one or more sensitive data handling teams within an organization such as a finance team, a human resources team or a research team.

Conventionally, data discovery for data at rest may be done from a top (root) container, usually provided by an IT administrator. For SharePoint™ by Microsoft Corporation of Redmond Wahington, USA, the top folder will be a site. For a shared drive in Google Drive™ by Google LLC of Mountain View, California, USA, it will be a top folder perhaps defined with a share name. In rare cases, a subject matter expert will be able to point the discovery to a department-specific resource such as "the HR SharePoint site" to start the analysis with sensitive data that is assumed to need to be protected. Such conventional methods starting top down data discovery from such starting points, will disadvantageously involve large amounts of data and the discovery will take a long time because the folder architecture is often more than ten to twenty layers deep requiring the task of finding documents that are sensitive to review millions of documents of lower importance.

Advantageously, the identifying 220 the user associated with the one or more documents at the data discovery starting point in accordance with the present embodiments identifies individuals or groups within an organization that are more likely to be handling sensitive data such as a finance team, a human resources team, a research team, a VAP, a leaver, or a person at risk of a cyber threat as determined from their position within their organization.

The method further includes discovering data 230 using activities and/or relationships of the user to discover subsequent documents to identify the sensitive data, which is the algorithm and logic to control the propagation of the discovery of sensitive data in accordance with the methods and systems of the present embodiments. The discovering data 230 includes identifying a first layer of documents 232 related to activities of the user such as identifying one or more documents trending around the user, one or more documents viewed by the user, one or more documents modified by the user, or one or more documents shared with the user. Such discovering data 230 can be captured and browsable outside the typical file folder tree structure in systems such as O365™ and SharePoint Online™ by Microsoft Corporation.

After processing the first layer of document 232, the discovery of documents can be extended following other relationships such as identifying a second layer of documents 234 determined in response to relationships of additional users to the user and/or relationships of additional documents related to the one or more documents in the first layer of documents. The identification of the second layer of documents 234 may include identifying one or more documents in a same folder as at least one of the one or more documents identified in the first layer of documents, or identifying documents associated with one or more additional users relevant to the user by relationship within an organization to which the user belongs, or identifying owners of the one or more documents identified as trending around the user, viewed by the user, modified by the user, or shared with the user, or identifying owners of the one or more documents in the same folder as the at least one of the one or more documents identified in the first layer of documents.

Lastly, protecting a document 240 identified by the second layer 234 if the document is determined to be a sensitive document. The method of discovering data in accordance with the present embodiments as exemplified by the flowchart 200 advantageously reduces the time to protection of sensitive data handled within organizational environments or by organizations.

Figure 3:
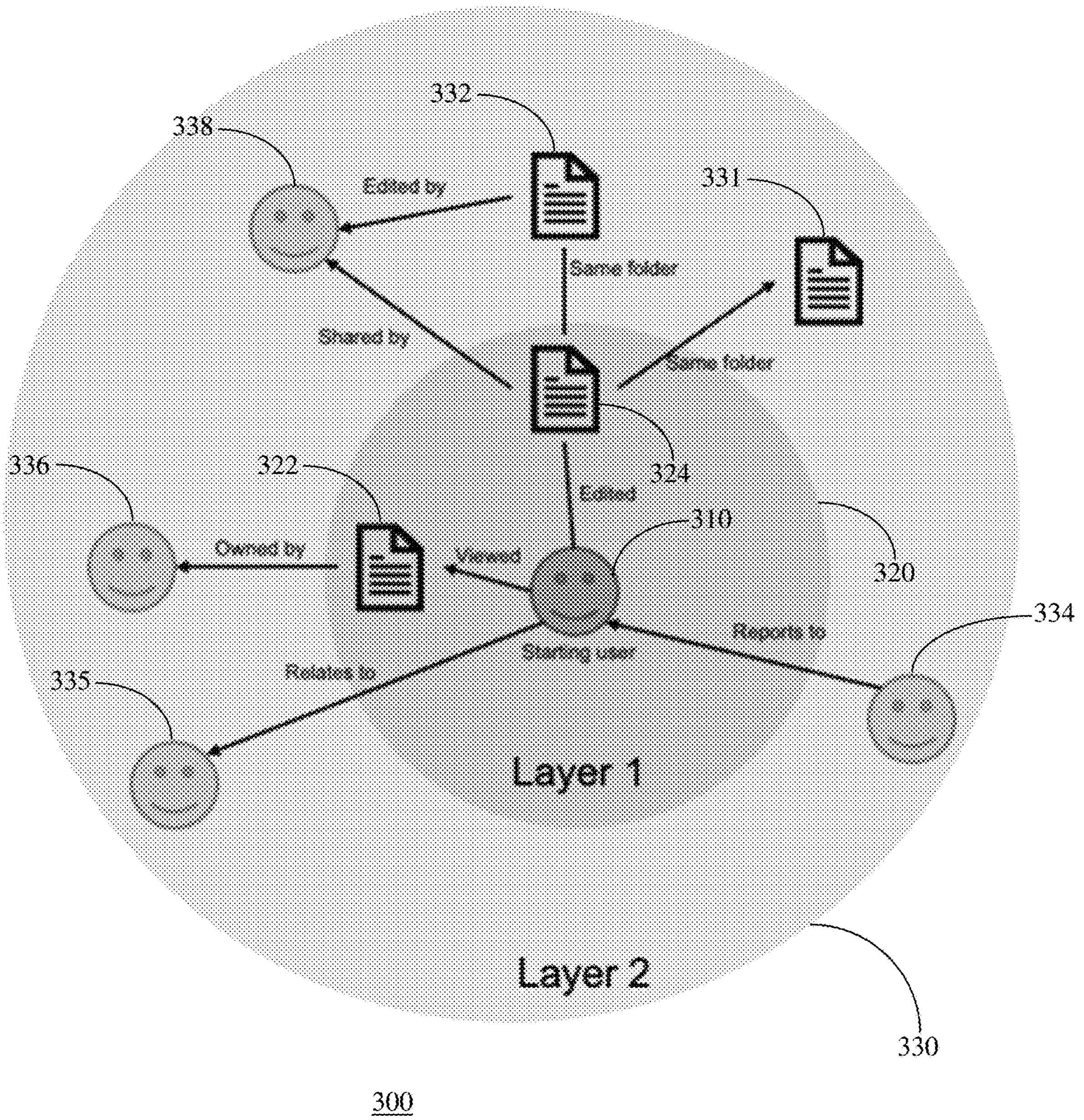
FIG. 3 depicts an illustration of the process for data discovery in accordance with the present embodiments.

Referring to FIG. 3, an illustration 300 depicts the process for data discovery in accordance with the present embodiments. Data discovery is set to start from the user 310 in the centre of the illustration who is the user identified at step 220 of the flowchart 200 (FIG. 2) as the individual associated with the one or more documents at the data discovery starting point likely to be handling sensitive data. Within "Layer 1" 320, documents are identified related to activities of the user 310 such as a document 322 viewed by the user 310 or a document 324 edited by the user 310.

After completion of discovering data 232 in "Layer 1", the computer-implemented data discovery method shown in the flowchart 200 moves to discovering data in "Layer 2" 330 which looks at users determined in response to their relationships to the user 310 or documents and/or users related to the documents 322, 324 discovered in "Layer 1" 320 as set out in step 234 (FIG. 2). Such documents could include documents in the same folder as a document discovered in "Layer 1" 320 such as documents 331, 332 in the same folder as the document 324. Such users determined in response to their relationships to the user 310 could include users 334, 335 as the user 310 reports to the user 334 and the user 310 relates to the user 335. In addition, such users determined in response to their relationship to the documents discovered in "Layer 1" 320 could include user 336 who owns the document 322 or user 338 who has edited the document 332 or to whom the document 324 has been shared.

Additional layers could include recursing over the users 334, 335, 336, 338 discovered in the "Layer 2" by repeating the method of steps 230, 232, 234, 240 of the flowchart 200 using the users 334, 335, 336, 338 as the identified user.

Figure 4:
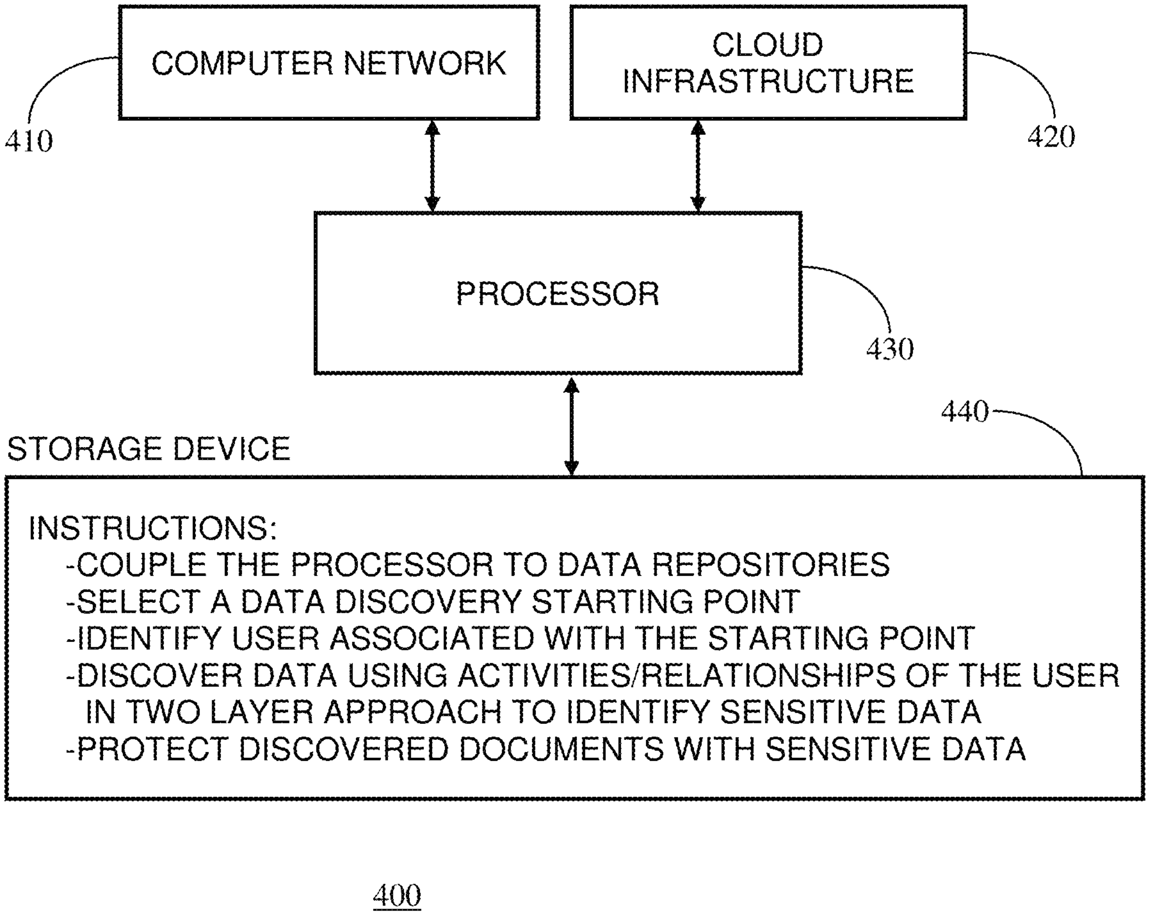
FIG. 4 depicts a system for data discovery in accordance with the present embodiments.

Referring to FIG. 4, a system 400 for data discovery for protection of sensitive data in accordance with the present embodiments is depicted. The system includes data repositories such as a computer network 410 and a cloud infrastructure 420. A processor 430 is coupleable to the computer network 410 and the cloud infrastructure 420. A storage device 440 is coupled to the processor and includes instructions to couple the processor 430 to the data repositories, select a data discovery starting point, identify a user associated with the starting point, discover sensitive data using activities and/or relationships of the user in accordance with the novel two-layer method in accordance with the present embodiments, and protect documents discovered which include the sensitive data.

Thus, it can be seen that the methods and systems of the present embodiments provide data discovery for identifying and prioritizing sensitive data that is quick, efficient and accurate which does not rely on examining data from a root container nor navigating through directory structures. The methods and systems in accordance with the present embodiments utilize data discovery logic which is people centric rather than data centric. The methods and systems in accordance with the present embodiments provide a novel two-layer user-centric data discovery approach which leverages data storage features to change the data discovery method to navigate through users' relationships and permissions instead of the conventional method of following a directories' structure thereby quickly and efficiently identifying sensitive data and protecting documents with the sensitive data.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims. Aspects described herein may be performed by systems and devices having hardware, software and/or a combination of both. In some example, a non-transitory computer-readable medium may be used to store computer-executable instructions to perform the functions described herein.

What is claimed is:

1. A computer-implemented method for protecting sensitive data within documents in one or more data repositories in a computer network or cloud infrastructure, the method comprising:

identifying, by a computing device having at least one processor and memory, a user associated with one or more documents in the one or more data repositories in the computer network or the cloud infrastructure, wherein the user comprises a very attacked person (VAP);

identifying, by the at least one processor, and based on activities and/or relationships of the user, subsequent documents that include the sensitive data, wherein identifying the subsequent documents comprises:

identifying, by the at least one processor and based on activities of the user, a first set of documents associated with the user in the one or more data repositories, the first set of documents including one or more of: documents viewed by the user, documents modified by the user, documents shared with the user, or documents trending around the user, and identifying, by the at least one processor and based on relationships corresponding to the user, a second set of documents different from the first set of documents, the second set of documents being identified based on one or more of: relationships of additional users to the user or relationships of additional documents related to one or more documents in the first set of documents, wherein identifying the second set of documents determined in response to relationships of additional documents related to one or more documents in the first set of documents further comprises identifying one or more documents in a same folder as at least one of the one or more documents identified in the first set of documents; and initiating, by the at least one processor and based on instructions stored in the memory, one or more security actions to address the sensitive data in one or more of the identified subsequent documents.

2. The computer-implemented method in accordance with claim 1, wherein identifying the second set of documents determined in response to relationships of additional users to the user further comprises identifying documents associated with one or more additional users relevant to the user by relationship within an organization to which the user belongs.

3. The computer-implemented method in accordance with claim 1, wherein identifying the second set of documents determined in response to relationships of additional users to the user comprises further identifying owners of one or more of: the one or more documents identified as trending around the user, modified by the user, or shared with the user.

4. The computer-implemented method in accordance with claim 1, wherein identifying the second set of documents determined in response to relationships of additional users to the user further comprises identifying owners of the one or more documents in the same folder as the at least one of the one or more documents identified in the first set of documents.

5. The computer-implemented method in accordance with claim 1, wherein the documents in the one or more data repositories in the computer network or the cloud infrastructure comprise a set of documents managed by one or more sensitive data handling teams within an organization.

6. The computer-implemented method in accordance with claim 5, wherein the one or more sensitive data handling teams within the organization include one or more of: a finance team, a human resources team or a research team.

7. The computer-implemented method in accordance with claim 1, wherein identifying the user comprises a VAP is based on their position within their organization.

8. A system for protection of sensitive data comprising:

one or more data repositories in a computer network or cloud infrastructure having data stored therein, the data managed by an organization and comprising the sensitive data;

a processor coupleable to the one or more data repositories in the computer network or cloud infrastructure; and a storage device for storing instructions, wherein the processor is configured to operate in response to the stored instructions to:

couple to the one or more data repositories in the computer network or cloud infrastructure;

identify a user associated with one or more documents in the one or more data repositories in the computer network or the cloud infrastructure, wherein the user comprises a very attacked person (VAP);

identify, using activities and/or relationships of the user, subsequent documents that include the sensitive data, wherein identifying the subsequent documents comprises:

identifying, by the processor and based on activities of the user, a first set of documents associated with the user in the one or more data repositories, the first set of documents including one or more of: documents viewed by the user, documents modified by the user, documents shared with the user, or documents trending around the user, and identifying, by the processor and based on relationships corresponding to the user, a second set of documents different from the first set of documents, the second set of documents being identified based on one or more of: relationships of additional users to the user or relationships of additional documents related to one or more documents in the first set of documents, wherein identifying the second set of documents determined in response to relationships of additional documents related to one or more documents in the first set of documents further comprises identifying one or more documents in a same folder as at least one of the one or more documents identified in the first set of documents; and initiate, based on instructions stored in the storage device, one or more security actions to address the sensitive data in one or more of the identified subsequent documents.

9. The system in accordance with claim 8, wherein the processor is further configured to operate in response to the stored instructions to identify the second set of documents determined in response to relationships of additional users to the user by identifying documents associated with one or more additional users relevant to the user by relationship within an organization to which the user belongs.

10. The system in accordance with claim 8, wherein the processor is further configured to operate in response to the stored instructions to identify the second set of documents determined in response to relationships of additional users to the user by identifying owners of the one or more documents identified as trending around the user, viewed by the user, modified by the user, and shared with the user.

11. The system in accordance with claim 8, wherein the processor is further configured to operate in response to the stored instructions to identify the second set of documents determined in response to relationships of additional users to the user by identifying owners of one or more of: the one or more documents in the same folder as the at least one of the one or more documents identified in the first set of documents.

12. The system in accordance with claim 8, wherein the documents in the one or more data repositories in the computer network or the cloud infrastructure comprise a set of documents managed by one or more sensitive data handling teams within an organization.

13. The system in accordance with claim 12, wherein the one or more sensitive data handling teams within the organization include one or more of: a finance team, a human resources team and a research team.

14. The system in accordance with claim 8, wherein the processor is further configured to operate in response to the stored instructions to identify the user comprises a VAP based on their position within their organization.

* * * * *